3,100,756
COMPOSITION CONSISTING ESSENTIALLY OF A POLYGLYCIDYL ETHER AND A LIQUID DIEPOXIDE AND CURED PRODUCT

John S. Fry, Wayne, N.J., assignor to Union Carbide Corporation, a corporation of New York
No Drawing. Filed Apr. 15, 1958, Ser. No. 728,509
17 Claims. (Cl. 260—30.4)

This invention relates to improved epoxide compositions. More particularly, this invention relates to compositions comprising polyglycidyl ethers of polyphenylols and a low viscosity liquid polyepoxide.

The viscosity of epoxides limits to a large extent the use to which the epoxides or epoxide compositions can be put. For example, in the casting art, it is necessary that the epoxide composition have a viscosity which will enable it to quickly fill the mold into which it is cast, otherwise the material will cure before it has a chance to adequately fill the mold cavities thus giving rise to so-called molding "shorts." Low viscosity epoxides are also desirable in order to adequately disperse therein curing agents, fillers, pigments and the like.

Polyglycidyl ethers of polyphenylols, such as are obtained by reacting, in aqueous caustic alkali, an aliphatic chlorohydrin such as epichlorohydrin or glycerol dichlorohydrin, with one or more phenols having three or more phenylol groups in their molecule are highly viscous syrups having viscosities on the order of 500,000 centipoises at 25° C. The high viscosity of these compounds precludes their wide use in casting applications for heat-hardenable compositions prepared therefrom are highly viscous and cure before adequately filling the mold cavities, thus giving rise to the aforementioned molding "shorts." In addition, the high viscosity of the aforementioned polyphenylols makes it exceptionally difficult to adequately blend these compounds with curing agents, pigments and fillers.

Attempts to adjust the viscosity of these polyglycidyl ethers by: (1) heating to temperatures on the order of 100–110° C. and/or (2) adding non-reactive solvents to the epoxides whereby they could be more easily processed and handled, have not proved successful. Heating the epoxides to temperatures of between 100–110° C. in order to decrease their viscosity is not practical for at these temperatures the glycidyl ethers, when mixed with hardeners and catalysts, rapidly polymerize and become increasingly viscous.

When non-reactive solvents are employed to reduce the viscosity of the polyglycidyl ether derivatives, additional procedures and costly equipment need to be employed in order to remove the solvent prior to curing the epoxide. The solvent, if not entirely removed, will produce bubbles which cause irregularities and weak points in the cured product. Also, unremoved solvent degrades the physical properties of the cured product, in particular, lowering the heat distortion temperature thereof.

My invention provides for a new class of epoxide compositions, suitable for use as casting compositions, whose viscosities can be controlled, as desired, without the aid of such external modifications as excess temperatures, and non-reactive solvents. My compositions can be easily and readily blended with curing agents, pigments and fillers to form compositions which are excellently suited for casting applications. Furthermore, the compositions of my invention have improved pot lives which can be controlled as desired to fit specific needs. Compositions can be formulated, therefore, which can be used under normal working conditions as they do not set and cure immediately upon preparation. On curing, however, in the presence of curing agents, such as mineral acids, Friedel-Crafts reagents, carboxylic acids, amines, phenols and the like, the compositions of this invention form hard, tough, infusible products having excellent resistance to acids and bases and also having excellent physical strengths as indicated by good flexural strengths, good Rockwell hardness values and excellent heat distortion temperature values.

The compositions of my invention comprise polyglycidyl ethers of polyphenylols having three or more phenylol groups in their molecule and having an epoxy equivalency of greater than two; and a low viscosity liquid polyepoxide having more than one epoxy group in its molecule thereby having an epoxy equivalency of greater than 1.

The polyglycidyl ethers of polyphenylols, as previously stated, are generally obtained by reacting in aqueous caustic alkali, an aliphatic chlorohydrin such as epichlorohydrin or glycerol dichlorohydrin with one or more polyhydric, polynuclear phenols or polyphenylols having three or more phenylol groups in their molecule. Of particular utility for purposes of this invention are polyglycidyl ethers of polyphenylols having at least three phenylol groups in their molecule linked together by one or more unsaturated aldehyde residue and wherein the polyglycidyl ether has a 1,2-epoxy equivalency of greater than 2. Generally, the polyglycidyl ethers contain $2x+1$ phenylol groups in their molecule which are linked together by $x$ number of unsaturated aldehyde residues

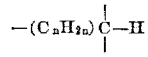

where $n$ is a whole number from 2 to 6 and $x$ is a whole number from 1 to 3. Polynuclear phenols particularly useful in making the polyglycidyl ethers of polyphenylols are described in application Serial No. 368,514 filed July 16, 1953 by Alford G. Farnham, now U.S. Patent No. 2,885,385. These polynuclear phenols are prepared by reacting in the presence of an acid catalyst such as hydrochloric acid at least three moles of a monohydric phenol such as phenol, cresol, and the like, having one or more active nuclear positions with one mole of an olefinic aldehyde having the formula $C_nH_{2n-1}CHO$, $n$ being a whole number from 2 to 6 as exemplified by acrolein, ethyl acrolein, crotonaldehyde and the like.

For a detailed discussion of the polyglycidyl ethers of polyphenylols containing at least three phenylol groups in their molecules, and the process for the production thereof, reference is made to Patent No. 2,801,989 to Alford G. Farnham which is herewith incorporated by reference.

The low viscosity liquid polyepoxides suitable for the purposes of this invention are those organic compounds containing more than one epoxy group

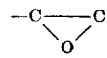

in their molecule, i.e., having an epoxy equivalency greater than one, and having a viscosity not exceeding about 10,000 centipoise at 25° C. The epoxides can be saturated, unsaturated, aliphatic, cycloaliphatic or aromatic and the epoxy may be present either as a terminal or interior group. Illustrative of such epoxides are the following: vinyl cyclohexene dioxide, butadiene dioxide, diglycidyl ether, diglycidyl ether of bis(4-hydroxyphenyl) methane, 1,2-bis(2,3-epoxy-2-methyl-propoxy)ethane, diglycidyl aniline, triglycidyl ether of para-amino phenol, bis(2,3-epoxy-2-methyl propyl)ether, bis(2,3-epoxy cyclopentyl)ether, 3,4-epoxy-6-methyl cyclohexyl methyl 3,4-epoxy-6-methyl cyclohexane carboxylate, bis(2,3-epoxybutyl)ether, diglycidyl cellosolve, bis(2,3-epoxybutyl ether) dimethyl diglycidyl ether, diethylene glycol bis(3,4-epoxycyclohexane carboxylate), bis(2,3-epoxy-2-methylpropyl)succinate, and limonene dioxide.

The epoxides particularly useful for purposes of this invention are the low viscosity liquid diepoxides. Furthermore, those diepoxides having the following general formula are particularly preferred.

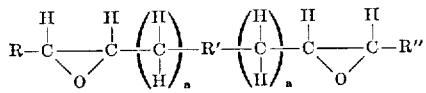

wherein R and R'' are hydrogen and/or alkyl and wherein R' is

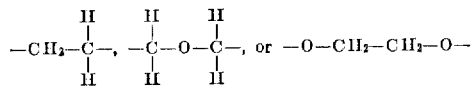

and $a$ is zero or a whole number from 1 to 3.

Generally, as little as about 12 percent by weight of the low viscosity liquid polyepoxide based on the weight og the glycidyl ether derivatives of the polyphenylols is sufficient to produce a composition having a pourable viscosity of less than about 20,000 centipoise at 60° C. which enables the composition to be readily cast and to produce a composition which has improved heat distortion properties. Generally, adding a low viscosity liquid polyepoxide in excess of about 50 percent by weight based on the weight of the polyphenylol is not particularly advantageous and is economically unsound.

In order to cure the epoxide compositions of this invention to hard, tough, insoluble products having high heat distortion values, it is customary to add curing agents thereto. Curing agents for epoxies are of two general types: (1) catalysts and (2) so-called hardeners. Catalysts are compounds which in general initiate a self-polymerization of the epoxide and are used in catalytic amounts i.e. from about 0.02 to about 4% by weight based on the total weight of all epoxides in the composition. The so-called hardening agents are compounds which generally undergo a reaction with the epoxide through the epoxy group, and are used in stoichiometric amounts.

Illustrative of the catalysts which can be conveniently used are tertiary amines, hydroxides, acids, Friedel-Crafts reagents and the like. Illustrative thereof are: benzyldimethylamine, benzyltrimethylammonium hydroxide, dilute alkali hydroxides, acidic catalysts, such as sulfuric acid, phosphoric acid, perchloric acid, polyphosphoric acid, and the various sulfonic acids, e.g., toluene sulfonic acid, benzene sulfonic acid; the metal halide Friedel-Crafts reagents, such as stannic chloride, zinc chloride, boron trifluoride, aluminum chloride, and ferric chloride. These various metal halide catalysts can be employed in the form of complexes, such as the etherates and amine complexes. Typical metal halide complexes are piperidine-boron trifluoride, monoethylamine-boron trifluoride, and ethylether-boron trifluoride.

As hardening agents, those organic compounds having two or more groups which are reactive with the epoxy groups can be conveniently used. Such compounds are primary and secondary amines, phenols, carboxylic acids and anhydrides thereof. As previously stated, hardening agents are generally employed in stoichiometric amounts as is well-known by those skilled in the art.

Typical amines are the aliphatic polyamines, such as ethylenediamine, diethylenetriamine, triethylenetetramine, tetraethylenepentamine, polyethylenepolyamines, propylenediamine, dipropylene triamine, polypropylenepolyamines, butylenediamines, pentylenediamines, hexylenediamines, octylenediamines, nonylenediamines, decylenediamines, dimethylurea, 1,3-diamino-2-propanol, 3,3'-imino-bis(propyl-amine), aromatic polyamines, such as meta-, ortho- and para-phenylenediamines, 1,4-napthalenediamine, 1,4 - anthradiamine, 3,3' - biphenyldiamine, xylylenediamine, 3,5-biphenylamine, 3,4-toluenediamine, alpha, alpha'-biparatoluidine, para, para'-methylenedianiline, 1 - methoxy - 6 - methylmeta - phenylene - diamine, para, para'-sulfonyldiamine, and heterocyclic polyamines, such as piperazine, 2,5-dimethylpiperazine, 2,4-diamine - 5 - (aminoethyl)pyrimidine, 2,4,6 - triaminopyrimidine, 3,9 - bis(aminoethyl)spirobi - metadioxane, and the like, N-hydroxyethylethylenediamine, N,N'-bis-hydroxyethyl)ethylenediamine, N - bis(hydroxyethyl)diethylenetriamine, N,N - bis(hydroxyethyl)diethylenetriamine, N,N''-bis(hydroxyethyl)diethylenetriamine, N-hydroxypropyldiethylenetriamine, N,N - bis(hydroxypropyl) diethylenetriamine, N,N'' - bis(hydroxy - propyl)diethylenetriamine, N-hydroxyethylpropylenediamine, N-hydroxypropylpropylenediamine, N - hydroxyethyldipropylenetriamine, N,N - bis(hydroxyethyl)dipropylenetriamine, N,N-bis(hydroxyethyl)dipropylenetriamine, tris-(hydroxyethyl)triethylenetetramine.

Representative polycarboxylic acids include malonic acid, succinic acid, glutaric acid, adipic acid, iso-sebacic acid, alkyl-succinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydro-muconic acid, beta-hydromuconic acid, diglycolic acid, dilactic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2,4-hexanetricarboxylic acid, 2-*propyl*-1,2,4-pentanetricarboxylic acid, 5-octene-3,3,6-tricarboxylic acid, 1,2,3-propanetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, and benzeneohexacarboxylic acid.

Among the phenols which are suitable are the following: catechol, hydroquinone, hydroxyhydroquinone, phloroglucinol, resorcinol, and pyrogallol; the di- or polynuclear phenols, such as the bisphenols described in the Bender et al. United States Patent No. 2,506,486. The phenols may contain alkyl, aryl or halogen ring substituents as exemplified by the alkyl resorcinols, the tribromo resorcinol and the diphenols containing alkyl and halogen substituents on the aromatic ring (Bender et al., U.S. Patent No. 2,506,486).

The polyhydric polynuclear phenols can consist of two or more phenols connected by such groups as methylene, alkylene ether, ketone and sulfone. The connecting groups are further exemplified by the following compounds: bis(p-hydroxyphenyl)ether, bis(p-hydroxyphenyl)ketone, bis(p-hydroxyphenyl)methane, bis(p-hydroxyphenyl)dimethylmethane, bis(p-hydroxyphenyl)sulfone.

The compositions of this invention are generally prepared by heating the syrupy polyphenylols to a temperature of about 60° C. in a glass or metal flask and then adding with agitation the low viscosity liquid polyepoxide whereby the polyphenylol, and low viscosity liquid polyepoxide are thoroughly blended. The low viscosity liquid polyepoxide is added and blended with the polyphenylol before any addition of a curing agent in order to form a composition of suitable viscosity in which the curing agent can be easily and adequately dispersed. Once the curing agent is added the blended mixture is degassed at about 60° C. and a pressure of 20 mm. of mercury in order to insure removal of any dissolved gases which, if not removed, cause undesirable bubble formation in the cured product.

The resultant compositions are characterized by a pourable viscosity of less than about 20,000 centipoise at 60° C. and a practical pot life of at least 30 minutes. Upon being subjected to heat on the order of 100–200° C. for 7 to 15 hours in steel molds, the compositions cure to tough insoluble products characterized by improved heat distortion temperatures, and excellent physical properties.

To further illustrate this invention, a polyglycidyl ether of a polyphenylol was prepared and combined with various low viscosity liquid polyepoxides as is illustrated by the examples which follow.

*Preparation of polyglycidyl ether of a polyphenylol containing a major portion of triphenylols:* To 2820 grams (30 mols) of phenol containing 1.8 cc. concentrated HCl (37%) there were added dropwise 168 grams (3 mols) acrolein at 40–45° C. The reaction was exothermic and cooling was required. It required one hour for all the acrolein to be added to the phenol. After the exothermic reaction ceased, heating was continued for one hour at 100° C. Unreacted phenol was then distilled off under reduced pressure (10–12 mm. Hg) to a temperature of 200° C. (thermometer bulb in the residue). The reddish colored residue was a liquid at 100° C. and solidified to a fusible brittle solid at room temperature. The yield was 865 grams or 90% theoretical based on a calculated molecular weight of 320 for a triphenylol derivative. Analysis of the product gave the following results: molecular weights 360; OH 15.1%; soluble in acetone and in ethyl alcohol and only slightly soluble in benzene. The determined molecular weight indicated that a major proportion of the reaction product consisted of triphenylols.

Eight hundred grams of the polyphenylol (7.5 equivalent OH groups) were dissolved in 525 grams ethyl alcohol and mixed with 2060 grams (22.5 mols) epichlorohydrin in a flask equipped with agitator and reflux. Seven hundred and three grams of a 50% aqueous solution of sodium hydroxide were added at the following rates, maintaining a temperature of 60°–61° C.; 10% during the first hour; 10% during the next one-half hour and 70% in the next hour. The temperature was then reduced to 50°–55° C., and the remaining 10% added during one hour. The reaction mixture was heated an additional fifteen minutes at 55° C., then distilled under subatmospheric pressure (50–75 mm. Hg) to a residue temperature (thermometer bulb in residue) of 65° C. The residue remaining in the flask was dissolved in 2500 cc. toluene and transferred to a separatory funnel where it was washed until the wash water was no longer alkaline to litmus. The washed toluene solution of the residue was distilled under reduced pressure (50 mm. Hg) to a residue temperature of 110° C. The residual yield was 1180 grams, this being 96.8% theory based on resin. The residue was light amber in color; with a viscosity of 500,000 centipoises at 25° C.; by analysis it had an epoxy content of 180 grams/gram mol epoxy ether or an epoxy equivalency of 3.0 chloride content was 0.3%.

The polyglycidyl ether prepared as described above and which is hereafter referred to as polyglycidyl "A" was combined with a low viscosity liquid polyepoxide as indicated in the following examples which are illustrative and are not intended to limit the scope of this invention in any manner. The viscosity values noted in the examples were determined by a Gardner viscometer at 25° C. unless otherwise stated.

*Example I*

To 182 grams of polyglycidyl "A," having a viscosity of 500,000 centipoise, and warmed to 60° C. in a glass flask was added 91 grams of bis(2,3-epoxycyclopentyl)-ether having a viscosity of about 2,000 centipoise. The mixture was thoroughly blended by stirring and to the mixture there was added 99 grams of molten 4,4' methylene dianiline. The resultant mixture was thoroughly admixed by stirring and then degassed at 60° C. under a pressure of 20 mm. of mercury.

The viscosity of the mixture was about 3,000 centipoise at 60° C.; the pot life of the mixture at 60° C. was about 30 minutes.

The mixture was poured into steel molds, the surfaces of which were coated with a silicone release agent, to form a ¼ inch thick sheet casting. The casting was cured by heating for 2 hours at 100° C.; for 4 hours at 185° C.; and for 1 hour at 200° C.

The cured casting was free of bubbles and fissures and had excellent physical properties as indicated by the following data.

Flexural strength
(ASTM–D–790–49T):
   At 77° F_____p.s.i__ 12,400
   At 400° F_____p.s.i__ 4,400
Heat distortion temperature (ASTM–D–248–45T) _____° C__ 232
Rockwell hardness_____ M–119

*Example II*

273 grams of polyglycidyl "A," 35 grams of vinyl cyclohexene dioxide having a viscosity of about 500 centipoise and 99 grams of 4,4'-methylene dianiline were admixed and degassed in a manner as described in Example I.

The viscosity of the mixture at 60° C. was 1,100 centipoise. The pot life of the mixture at 60° centigrade was 30 minutes.

The mixture was poured into steel molds to form a ¼ inch thick sheet casting and the casting cured by the process described in Example I. The cured casting was free of bubbles and fissures and had excellent physical properties as indicated by the following data:

Flexural strength
(ASTM–D–790–49T):
   At 77° F_____p.s.i__ 14,600
   At 400° F_____p.s.i__ 3,630
Heat distortion (ASTM–D–248–45T)____° C__ 202
Rockwell hardness_____ M–121

*Example III*

274 grams of polyglycidyl "A," 39.8 grams of dimethyl diglycidyl ether having a viscosity of about 500 centipoise and 99 grams of 4,4'-methylene dianiline were admixed and degassed in a manner described in Example I.

The viscosity of the mixture at 60° C. was 1,100 centipoise. The pot life of the mixture at 60° C. was 30 minutes.

The mixture was poured into steel molds, the surfaces of which were coated with a silicone release agent, to form a ¼ inch thick sheet casting. The casting was cured by heating for 2 hours at 100° C.; for 4 hours at 185° C.; and for 1 hour at 200° C.

The cured casting was free of bubbles and fissures and had excellent physical properties as indicated by the following data.

Flexural strength
(ASTM–D–790–49T):
   At 77° F_____p.s.i__ 12,500
   At 400° F_____p.s.i__ 2,810
Heat distortion temperature (ASTM–D–248–45T) _____° C__ 224
Rockwell hardness_____ M–118

*Example IV*

264 grams of polyglycidyl "A," 36 grams of vinyl cyclohexene dioxide having a viscosity of about 500 centipoise and 12 grams of a boron trifluoride-ethylamine complex containing 47% by weight boron trifluoride were admixed and degassed in a manner described in Example I.

The viscosity of the mixture at 60° C. was 2,000 centipoises. The pot life of the mixture was about 1 hour at 60° C.

The mixture was poured into steel molds, the surfaces of which were coated with a silicone release agent, to form a ¼ inch thick sheet casting. The casting was cured adiabatically for 4 hours; heated at 125° C. for 8 hours; heated at 180° C. for 4 hours; and then heated at 200° C. for 1 hour.

The cured casting was free of bubbles and fissures and had excellent physical properties as indicated by the following data.

Flexural strength (ASTM-D-790-49T):
At 77° F _____ p.s.i. __ 6,400
At 400° F _____ p.s.i. __ 3,390
Heat distortion temperature
(ASTM-D-248-45T) _____ ° C. __ 265
Rockwell hardness _____ M-119

*Example V*

210 grams of polyglycidyl "A," 90 grams of bis(2,3-epoxy cyclopentyl)ether, having a viscosity of 1,000 centipoise and 12 grams of a boron trifluoride-ethylamine complex were admixed and degassed in a manner as decribed in Example I.

The viscosity of the mixture at 60° C. was 3,000 centipoise. The pot life of the mixture at 60° C. was about 45° C.

The mixture was poured into steel molds, the surfaces of which were coated with a silicone release agent, to form ¼ inch thick sheet casting. The casting was cured by heating for 8 hours at 100° C.; for 3 hours at 185° C.; and for 1 hour at 200° C.

The cured casting was free of bubbles and fissures and had excellent physical properties as indicated by the following data.

Flexural strength (ASTM-D-790-49T):
At 77° F _____ p.s.i. __ 9,110
At 400° F _____ p.s.i. __ 3,280
Heat distortion temperature
(ASTM-D-248-45T) _____ ° C. __ 257
Rockwell hardness _____ M-118
Izod impact strength
(ASTM-D-256-54T) _____ ft. lbs./inch __ 0.18

Whereas non-reactive solvents and diluents which have hitherto been used in admixture with polyepoxides to decrease the viscosity thereof have a degrading effect upon physical properties of the epoxide, particularly with respect to heat distortion temperatures, the compositions of this invention have increased heat distortion temperatures. To further illustrate this point, 182 grams of polyglycidyl "A" and 99 grams of molten 4,4'-methylene dianiline were admixed and degassed in a manner described in Example I.

The mixture was also cured in a manner as described in Example I.

The heat distortion temperature of the cured casting was only 187° C. The heat distortion temperatures of the cured compositions of this invention as illustrated by the foregoing examples, were in excess of 200° C.

A high heat-distortion value is an important desideratum in the use of these polyethers as molded or otherwise shaped articles as for example electrical relays, gears, etc., exposed to high temperatures and whose mechanical or electrical function would be impaired by dimensional changes caused by high temperature.

What is claimed is:

1. A composition consisting essentially of a polyglycidyl ether of a polyphenylol, said phenylol having $2x+1$ polyphenylol groups in its molecule which are linked together by $x$ number of unsaturated aldehyde residues having the general formula

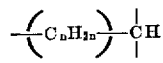

wherein $n$ is a number from 2 to 6 and $x$ is a number from 1 to 3, and said polyglycidyl ether having an epoxy equivalency of greater than 2; and a liquid diepoxide having a viscosity not exceeding about 10,000 centipoises at 25° C., said liquid diepoxide being present in an amount of about 12 percent by weight to about 50 percent by weight, based on the weight of the said polyglycidyl ether.

2. A composition as defined in claim 1 wherein the low viscosity liquid diepoxide is bis(2,3-epoxy cyclopentyl)-ether.

3. A composition as defined in claim 1 wherein the low viscosity liquid diepoxide is vinyl cyclohexene dioxide.

4. A composition as defined in claim 1 wherein the low viscosity liquid diepoxide is dimethyl diglycidyl ether.

5. A composition consisting essentially of a polyglycidyl ether of a polyphenylol, said phenylol having $2x+1$ polyphenylol groups in its molecule which are linked together by $x$ number of unsaturated aldehyde residues having the general formula

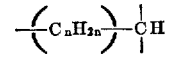

wherein $n$ is a number from 2 to 6 and $x$ is a number from 1 to 3, and said polyglycidyl ether having an epoxy equivalency of at least 3; and a liquid diepoxide having a viscosity not exceeding about 10,000 centipoise at 25° C., said liquid diepoxide being present in an amount of from about 12 percent by weight to about 50 percent by weight, based on the weight of said polyglycidyl ether.

6. A composition consisting essentially of a polyglycidyl ether of a polyphenylol, said phenylol having $2x+1$ polyphenylol groups in its molecule which are linked together by $x$ number of unsaturated aldehyde residues having the general formula

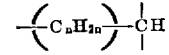

wherein $n$ is a number from 2 to 6 and $x$ is a number from 1 to 3, and said polyglycidyl ether having an epoxy equivalency of greater than 2; a liquid diepoxide having a viscosity not exceeding about 10,000 centipoises at 25° C., said diepoxide being present in an amount of from about 12 percent by weight to about 50 percent by weight, based on the weight of said polyglycidyl ether, and a curing agent in an amount sufficient to cure said composition to a hard, tough, insoluble product.

7. The cured product of the composition defined in claim 6.

8. A composition as defined in claim 6 wherein the curing agent is 4,4'-methylene dianiline.

9. A composition as defined in claim 6 wherein the curing agent is boron trifluoride-ethylamine complex.

10. A composition as defined in claim 6 wherein the curing agent is a catalyst for curing said composition and is present in said composition in an amount of from about 0.02 percent by weight to about 4 percent by weight based on the weight of said polyglycidyl ether and said liquid diepoxide.

11. A composition as defined in claim 6 wherein the curing agent is a hardener for curing said composition and is present in said composition in stoichiometric amounts.

12. A composition consisting essentially of a polyglycidyl ether of a polyphenylol, said polyphenylol having $2x+1$ phenylol groups in its molecule which are linked together by $x$ number of unsaturated aldehyde residues having the general formula

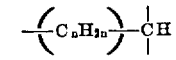

wherein $n$ is a number from 2 to 6 and $x$ is a number from 1 to 3, and said polyglycidyl ether having an epoxy equivalency of greater than 2; a liquid diepoxide having the general formula:

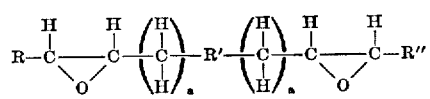

wherein R and R" are selected from the group consisting of hydrogen and alkyl, and R' is selected from the group consisting of

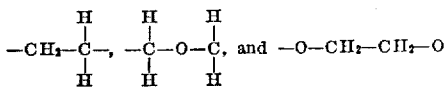

and $a$ has a value of 0 to 3, said liquid diepoxide being present in said composition in an amount of from about 12 percent by weight to about 50 percent by weight based on the weight of said polyglycidyl ether, and a curing agent in an amount sufficient to cure said composition to a hard, tough, insoluble product.

13. The cured product of the composition defined in claim 12.

14. A composition consisting essentially of a polyglycidyl ether of a polyphenylol, said polyphenylol having $2x+1$ phenylol groups in its molecule which are linked together by $x$ number of unsaturated aldehyde residues having the general formula

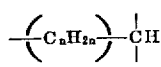

wherein $n$ has a value of 2 and $x$ has a value of 1, and said polyglycidyl ether having an epoxy equivalency of greater than 2; a liquid diepoxide having a viscosity not exceeding about 10,000 centipoises at 25° C., said liquid diepoxide being present in an amount of from about 12 percent by weight to about 50 percent by weight, based on the weight of said polyglycidyl ether, and a curing agent in an amount sufficient to cure said composition to a hard, tough, insoluble product.

15. The cured product of the composition defined in claim 14.

16. A composition consisting essentially of a polyglycidyl ether of a polyphenylol, said phenylol having $2x+1$ polyphenylol groups in its molecule which are linked together by $x$ number of unsaturated aldehyde residues having the general formula

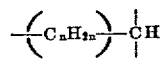

wherein $n$ has a value of 2 and $x$ has a value of 1, and said polyglycidyl ether having an epoxy equivalency of greater than 2; a liquid diepoxide having the general formula:

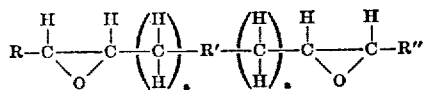

wherein R and R" are selected from the group consisting of hydrogen and alkyl, and R' is selected from the group consisting of

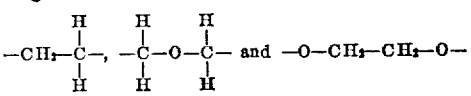

and $a$ has a value of 0 to 3, said liquid diepoxide being present in said composition in an amount of from about 12 percent by weight to about 50 percent by weight, based on the weight of said polyglycidyl ether, and a curing agent for curing said composition to a hard, tough, insoluble product.

17. The cured product of the composition defined in claim 16.

References Cited in the file of this patent
UNITED STATES PATENTS

| | | |
|---|---|---|
| 2,786,066 | Frostick et al. | Mar. 19, 1957 |
| 2,801,989 | Farnham | Aug. 6, 1957 |
| 2,849,416 | Bender et al. | Aug. 26, 1958 |

UNITED STATES PATENT OFFICE
CERTIFICATE OF CORRECTION

Patent No. 3,100,756                                August 13, 1963

John S. Fry

It is hereby certified that error appears in the above numbered patent requiring correction and that the said Letters Patent should read as corrected below.

Column 3, line 18, for "og" read -- of --; column 4, line 35, for "benzeneohexacarboxylic" read -- benzenehexacarboxylic --; column 5, line 21, for "weights" read -- weight --; column 7, line 63, for "phenylol" read -- polyphenylol --; line 64, for "polyphenylol" read -- phenylol --; column 8, line 12, for "phenylol" read -- polyphenylol --; same line 12, strike out "poly-"; same column 8, line 27, and column 9, line 36, for "phenylol", each occurrence, read -- polyphenylol --; column 8, line 28, and column 10, line 1, for "polyphenylol", each occurrence, read -- phenylol --.

Signed and sealed this 12th day of May 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,100,756                                                         August 13, 1963

John S. Fry

It is hereby certified that error appears in the above numbered patent requiring correction and that the said Letters Patent should read as corrected below.

Column 3, line 18, for "og" read -- of --; column 4, line 35, for "benzeneohexacarboxylic" read -- benzenehexacarboxylic --; column 5, line 21, for "weights" read -- weight --; column 7, line 63, for "phenylol" read -- polyphenylol --; line 64, for "polyphenylol" read -- phenylol --; column 8, line 12, for "phenylol" read -- polyphenylol --; same line 12, strike out "poly-"; same column 8, line 27, and column 9, line 36, for "phenylol", each occurrence, read -- polyphenylol --; column 8, line 28, and column 10, line 1, for "polyphenylol", each occurrence, read -- phenylol --.

Signed and sealed this 12th day of May 1964.

(SEAL)
Attest:

ERNEST W. SWIDER
Attesting Officer

EDWARD J. BRENNER
Commissioner of Patents